(12) United States Patent
Burt et al.

(10) Patent No.: US 8,799,942 B2
(45) Date of Patent: Aug. 5, 2014

(54) DATA DRIVEN TEST FIXTURE FOR SYSTEMS OF WEB SERVICES

(75) Inventors: Donald V. Burt, Boulder, CO (US); Scott Stodghill, Evergreen, CO (US); Geoff Paddle, Colorado Springs, CO (US); Steven Saunders, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 194 days.

(21) Appl. No.: 13/429,086

(22) Filed: Mar. 23, 2012

(65) Prior Publication Data

US 2012/0246674 A1 Sep. 27, 2012

Related U.S. Application Data

(60) Provisional application No. 61/466,691, filed on Mar. 23, 2011.

(51) Int. Cl.
*H04N 7/10* (2006.01)
*H04N 7/025* (2006.01)

(52) U.S. Cl.
USPC .............. 725/32; 725/19; 725/36; 725/107

(58) Field of Classification Search
USPC ...................... 725/19, 32, 36, 107
See application file for complete search history.

(56) References Cited

U.S. PATENT DOCUMENTS 7,543,328 B2 * 6/2009 Bialk et al. ............... 725/129
8,191,048 B2 * 5/2012 Parthasarathy et al. ....... 717/126
8,555,325 B2 * 10/2013 Kozlowski et al. ........... 725/107

* cited by examiner

*Primary Examiner* — Pankaj Kumar
*Assistant Examiner* — Charles N Hicks
(74) *Attorney, Agent, or Firm* — Great Lakes Intellectual Property, PLLC.

(57) ABSTRACT

A data driven test system for web service or other service dependent on message exchange between service points or other communicating entities is contemplated. The testing system may be configured as a multi-stage tester having capabilities to conduct sequence, structure, and content test in order to narrowly identify errors of service points while subjected to a test protocol.

10 Claims, 4 Drawing Sheets

US 8,799,942 B2

DATA DRIVEN TEST FIXTURE FOR SYSTEMS OF WEB SERVICES

CROSS-REFERENCE TO RELATED APPLICATIONS

This application claims the benefit of U.S. provisional Application No. 61/466,691 filed Mar. 23, 2011, the disclosure of which is incorporated in its entirety by reference herein.

TECHNICAL FIELD

The present invention relates to facilitating testing of message dependent systems, such as but not limited to systems designed to provide web services or other types of services where messages are required to be communicated between multiple service points.

BACKGROUND

Various protocols and standards exist to define processing, messaging and other types of activities for entities attempting to provide services. The Society of Cable Telecommunications Engineers (SCTE), for example, has defined a standard to facilitate advertisement insertion, entitled Digital Program Insertion (SCTE-130), the disclosure of which is hereby incorporated by reference in its entirety. Service providers or component suppliers may be required to comply with one or more standards prior to introducing a service or providing components for use in facilitating the service, e.g., compliance with SCTE-130 may be required prior to facilitating digital advertisement insertion. It may be advantageous to test for compliance with the appropriate one or more standards prior to introducing the service or selling a component to a system-level provider of the service.

The standards may define an abundance of variables and options for implementing certain tasks or conducting certain use cases. The variability or lack of specificity can result in some service providers testing for compliance differently from other service providers. The service providers may also configure the operation of their systems according to their particular compliance settings, which can result in some system being inoperable with other system even though both system comply with the same standard. Accordingly, a need exists to provide a testing fixture sufficient for testing the service points for compliance with the desired standard in a manner that is consistent across service providers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
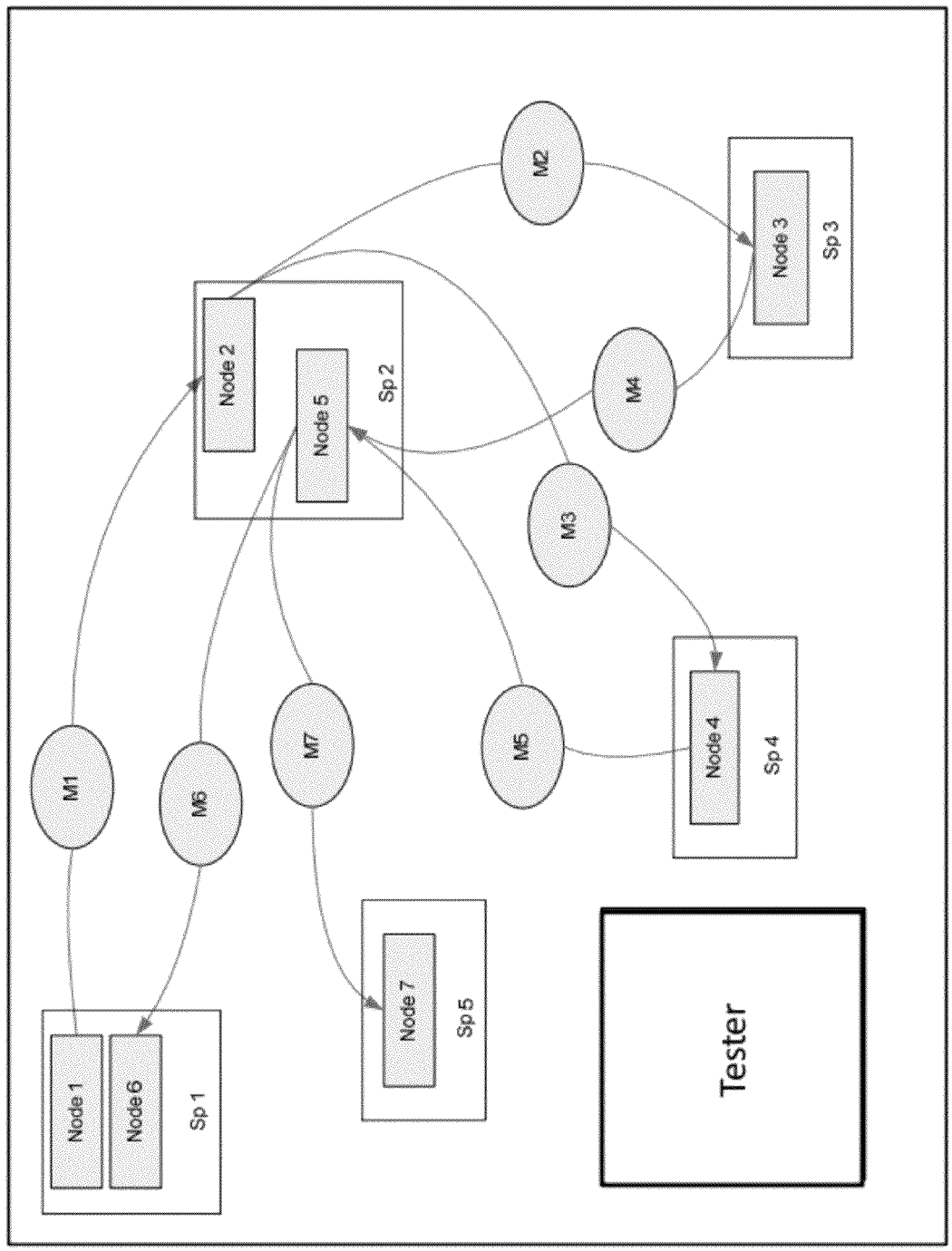
FIG. 1 illustrates a testing system in accordance with one non-limiting aspect of the present invention.

FIG. 1 illustrates a testing system in accordance with one non-limiting aspect of the present invention. The testing system illustrates a plurality of service points (SPs) configured to facilitate providing a service. The service points may be associated with any device or portion of a device associated with processing signals associated with implementing the service. The service points are shown to include one or more nodes configured to facilitate communicating messages. The service or services provided with assistance of the service points may relate to any message dependent service where message exchanged between multiple service points is required. The testing system is predominately described with respect to the use of first, second, third, fourth, and fifth service points to facilitate a video on demand (VOD) service. The testing system may include a tester to facilitate testing an ability of the service points to provide the VOD service, such as but not limited to testing whether the service points are in compliance with the advertisement insertion standard SCTE-130. While described with respect to the VOD service and testing compliance with SCTE-130, the present invention is not intended to be so limited and fully contemplates its use and application in testing any type of service point, any type of service, and compliance with any type of standard or protocol.

The first service point may relate to a VOD server, the second service point may relate to a decision system server, the third service point may relate to a content information server, the fourth service point may relate to a placement opportunity server, and the fifth service point may relate to a logging server. The VOD server may be configured to facilitate VOD services for a subscriber of a service provider (not shown). The VOD server may be configured to transmit television programming and other video/audio to the subscriber over the cable television system or other system, such as but not limited to a cellular telephone system, an optical data system or a high-speed IP data system. The VOD server may, for example, may be associated with a multiple system operator (MSO) and one or more of the decision system server, the content information server, the placement opportunity server, and the logging server may be similarly associated with the MSO or a third-party provider. The messages exchanged between the various service points are denoted with the letter M and a numerical value. These messages may be exchanged between the service points over an inside network or a proprietary/private network of the MSO and/or over the Internet or other public network. In particular, the present invention contemplates a scenario where a portion of the service points communicate over an inside network of the MSO and a portion of the service points communicating over the Internet.

When the subscriber orders a particular piece of content through the VOD server, the VOD server may desire to insert an advertisement, a message, a watermark or other digital content to the ordered content (email, text message, etc.). This may include the VOD server, for example, inserting an advertisement while streaming or otherwise transmitting a television program to the subscriber. It may be desirable for the VOD server to facilitate advertisement insertion according to SCTE-130. The VOD server and the other service points associated with facilitating the advertisement insertion may also need to be compliant with SCTE-130 in order to properly facilitate insertion of the advertisement. The process associates with selecting and inserting the advertisement may require the service points to exchange messages according to a predefined sequence. The sequence of messages illustrated in FIG. 1 corresponds with the VOD server issuing a first message, the decision system server issuing second and third messages resulting from processing of the first message, the content information server issuing a fourth message resulting from processing of the second message, the placement opportunity server issuing a fifth message resulting from processing of the third message, the decision system server issuing a sixth and seventh message resulting from processing of the fifth message.

The first message may relate to the VOD server requesting advertisement information from the decision system server regarding the advertisement to be inserted within a VOD program being transmitted for viewing. The second message may relate to the decision system server requesting content information from the content information server to facilitate selecting the advertisement. The third message may relate to the decision system server requesting placement opportunity information from the placement opportunity server to facilitate timing insertion of the advertisement. The fourth message may relate to content information server providing the requested content information to the decision system server. The fifth message may relate to the placement opportunity server providing the requested opportunity information to the decision system server. The sixth message may relate to the decision system server providing the requested advertisement information to the VOD server. The seventh message may relate to the decision system server providing accounting information or other information for logging usage of the advertisement, such as to facilitate billing an advertiser associated with the advertisement. While the present invention is described with respect to the noted messages and the sequence of communicating the messages, the present invention is not necessarily so limited and fully contemplates any sequence and number messages being used to facilitate advertisement insertion.

In particular, the present invention contemplates addressing the difficulties of identifying the appropriate messages and the sequence of the messages necessary to test compliance with a desired standard. The SCTE-130 standard, for example, would allow various messages and sequences of messages to be relied upon when facilitating the advertisement assertion process described above. To ameliorate some of the difficulties associated with selecting the appropriate combination and/or sequence of messages, the present invention contemplates generating or defining a testing protocol. The testing protocol may define a plurality of test messages and a particular test sequence sufficient for testing compliance with the SCTE-130 standard. Such a testing protocol may address a specific use cases associated with the capabilities of the SCTE-130 standard by defining the test message sequence such that each test message has a certain expectation for content and structure of its data elements. One non-limiting aspect of the present invention contemplates testing for compliance with the SCTE-130 standard depending on whether the service points are able to exchange messages that match with the test messages and test sequence. This may include the tester initiating the test protocol and collecting messages issued thereafter from the service points as sample message. The sample message and their corresponding sample sequence may be compared to the test messages and test sequence to assess compliance.

The tester may be configured to intercept or otherwise sample each of the messages communicated between the service points to determine the sample messages. This may include the tester acting as a proxy or other intermediary and having capabilities sufficient to facilitate relaying the messages between the service point originating a message and the service point intended to receive the message. In addition to assessing the sample sequence associated with the sample message, the tester may be configured to assess the structure and content of the sample message, referred to as sample structure and sample content, relative to expected or test structure and content for the corresponding test message. The tester may detect sequence, structure, and/or content errors when the sample messages exchanged between the service points while subject to the test protocol differ from the expected, test sequence, structure, or content of the messages. The tester may be configured to test the entire advertisement insertion process without having to re-start or otherwise interrupt the process to assess one or more of the messages. The tester may be configured to instruct the first service point to issue the first message, and optionally thereafter, to issue no further instructions to particular service points such that the service points themselves are required to process the received message and to issue any resulting message(s) independently of instructions from the tester.

The ability of the tester to monitor the entire sequence of sample messages issued from the service points when subjected to the test protocol may be preferred over the tester individually instructing each service point to individually output the sample messages at each stage of the test protocol. For example, in the event the tester was required to perform a linear test or other testing procedure where individual instruction were to be sent to each of the service points at each stage, the tester would be required to issue separate instructions to each service point for each message to be issued such that a one-to-one relationship between instruction and message output would be required. While the present invention fully contemplates a tester being configured in this manner, the present invention believes it may be more beneficial to configure the tester to facilitate a one-to-many relationship so that it can instruct the first service point to issue the first message and thereafter monitor the messages issued from the remaining service points without having to individually instruct the remaining service points to issue the message. This type of sequence monitoring allows the tester to issue one message which results in many messages being generated from the service points as result of the initial message, thus exercising the message sequence logic of the service points rather than having those decisions rely on the tester.

Figures 2, 3:
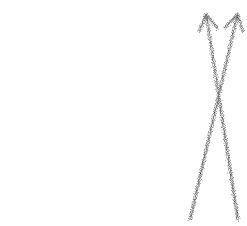
FIG. 2 illustrates a test table in accordance with one non-limiting aspect of the present invention.
FIG. 3 illustrate a sample table in accordance with one non-limiting aspect of the present invention.

FIG. 2 illustrates a test table of the test sequence for the test protocol shown in FIG. 1. FIG. 3 illustrate a sample table of a sample message collected by the tester while the service points were subjected to the test protocol where a sequence error is illustrated. The tables include a first column to identify edge IDs or stages of the test protocol (e.g., clock cycles), a second column identifying a message type of the message for the corresponding stage, a third column for the next node/service point to receive the corresponding message, and a fourth column for the prior node/service point transmitting the corresponding message. The error is shown to correspond with the third service point issuing the fourth message prior to receipt of the third message at the fourth service point. This type of sequence error may correspond with transmission delays in transmitting the third message to the fourth service point. The tester may be configured to determine the illustrated sequence order by comparing the test table with the sample table and identifying the sequence error when test message fails to sequentially match with sample messages, i.e., where the order of the test message deviates from the order of the sample messages. The tester may be configured to perform the error assessment without generating the illustrated tables, such as in a dynamic manner.

The contemplated one-to-many sequence testing and capability of the tester to map each of the sample messages may be beneficial in providing an overall assessment of the tested service. This ability allows the present invention to test mutually dependent messages—messages where the output of one message results from processing of two or more message where the two or more messages themselves are output from at least two different service points. The sixth and seventh message shown in FIG. 1 correspond with mutually dependent message as they each results from processing of the fourth and fifth messages by the second service point. In the event the tester were configured to test for each message independently, it would simply instruct the second service point to output the sixth message and then separately instruct the second service point to output the seventh message. Such a linear testing strategy would be unable to cause the sixth and seventh message to be issued dependently to issuance of the fourth and fifth message from the third and fourth service points. The ability to test mutually dependent message is believed to be particular beneficial in providing a better compliance assessment of the service versus a testing process that is unable to map to the message events triggering mutually dependent messages. The contemplated sequencing test may be further refined with the test for structure and content errors.

In the event the sample table matches with the test table, the tester may proceed with assessing for structure and content errors by assessing whether the message types match. This type of assessment may be contingent on the sample and test tables matching since, in the absence of a matching sequence, the expected structure and content would necessarily not match, rendering additional analysis unnecessary. The contemplated analysis of the message type may be beneficial as a possibility exists for the service points to issue the sample message in a sample sequence matching the test sequence but with one or more of the sample message having a sample structure or sample content failing to match with the test structure or test content of the corresponding test message. These types of errors, for example, may occur in the event one of the service points fails to properly process a message according to the desired output of the test protocol. SCTE-130 and other protocols or standards contemplated for testing in accordance with the present invention may specify different profiles or use cases or other optional processes that may be undertaken to process received messages. The further assessment of message structure and content determines whether the service points are processing messages according to the desired profile or use case dictated by the test protocol.

Figure 4:
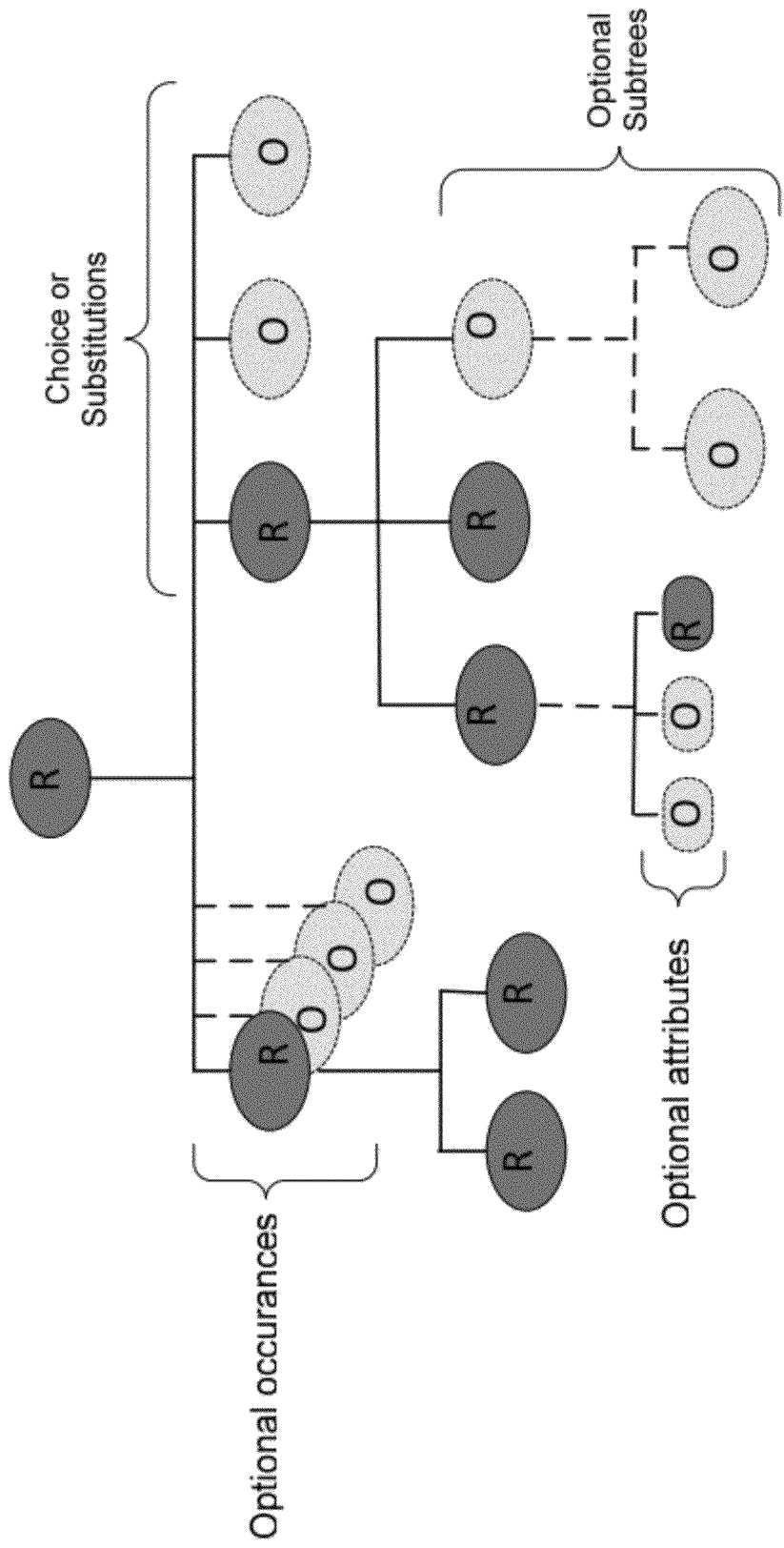
FIGS. 4-5 illustrate pictorials of XML document elements in accordance with non-limiting aspects of the present invention.
Figure 5:
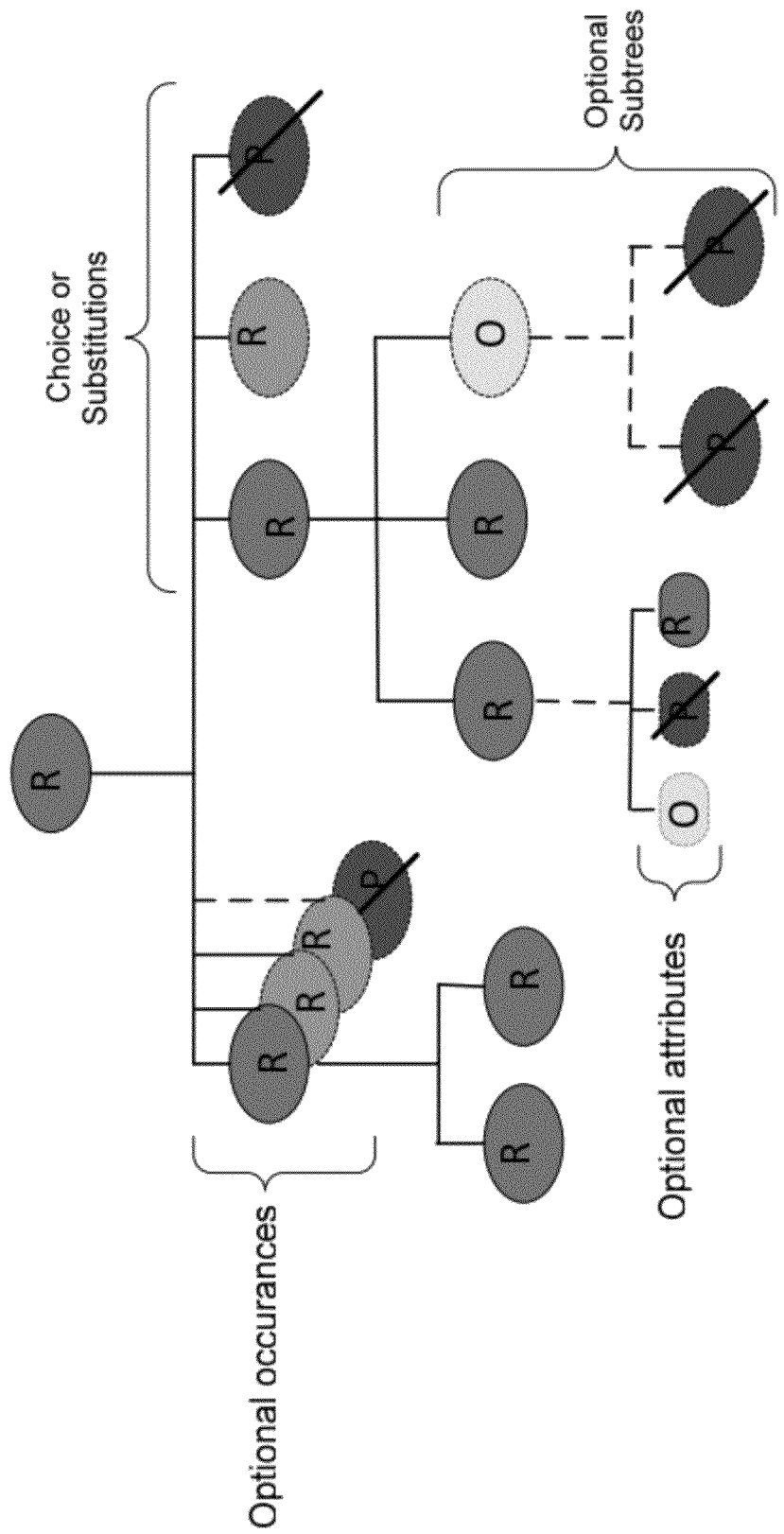

FIGS. 4-5 respectively illustrate first and second pictorials of XML document elements in accordance with non-limiting aspect of the present invention. The first and second pictorials are basically structured in a tree-like manner according to XML syntax. The first pictorial illustrates data elements legal under a generic schema, such as any schema associated with SCTE-130. The second pictorial illustrates data elements legal under a subset of the first pictorial, referred to as a profile. The second pictorial or profile may be used to define the test structure for a particular use case of SCTE-130 whereas the first pictorial or schema defines all available capabilities within SCTE-130. In this manner, the profile may be used to more narrowly define the particular operation of the service points being tested, e.g., advertisement insertion, and the corresponding legal or test structure associated therewith. While not shown, a similar arrangement may be used to define content for the elements in order to facilitate the contemplated content testing. The actual structure or content testing may be done against examples of the profiles that have concrete rules for populating and validating each data element that will be present in the example document.

FIG. 5 illustrates the test structure as being comprised of a plurality of optional occurrences, a plurality of choices or substitutions, a plurality of optional attributes, and a plurality of optional substrees. An "R" may be used to indicate the corresponding data element is required to be present, a "O" may be used to indicated the corresponding data element is optional, and a "P" may be used to indicate the corresponding data element is prohibited. FIG. 4 illustrates the absence of prohibited data elements since the schema defines what can be present. So, for example, the optional occurrence and the top left is 1 to 4 in the schema and exactly 3 in the restricted version of FIG. 5, and the choice end up a choice of two, with the third prohibited. FIG. 4 represents the structure of document elements and attributes across all the possible XML documents that would be valid under some set of XML Schemas. FIG. 4 does not represent an actual, valid, XML document, but rather the set of all documents. One difference between this representation and a representation of a single valid document is in the upper right corner where a set of three choice or substitution elements are present as possible child elements. In any single, valid, document only one of these can be present, but all three may be valid across all possible documents.

FIG. 5 shows the structures of FIG. 4 after being further constrained to define the valid documents some particular use case. These constraints restrict the choice and occurrence options present in the schema set to eliminate the possible appearance of document elements and attributes that are not appropriate to the use case. It is frequently true that the constrained set of elements for a particular case is very much smaller that the possible set of elements.

The tester may be configured to determine structure errors to correspond with sequentially matched sample and test messages having unmatched sample and test structures. The tester may be configured to identify a sample structure value for each sample structure data element. The test structure for each test message may define a structure expectation to be one of possibly present, necessarily present, or necessarily absent. The matched sample and test messages having unmatched sample and test structures may be those where the sample structure value fails to fulfill the one of the possibly present, necessarily present, and necessarily absent structure expectation. The structure expectation for example may be used to assess whether the sample value of the associated data element is specified, such as a value indicating the number of advertisements desired for insertion. The test structure may require a certain value to be possibly present, i.e., optional, or necessarily present, i.e., required, or necessarily absent, i.e., absent, in order to be valid or acceptable. A structure error may be determined for each sample message where the sample value deviates from the desired expectation structure.

In the event the sample message structure matches with the test structure, i.e., it includes a sample value sufficient to satisfy the expected structure, a further content assessment may be conduct to determine whether the content of the sample value or data element corresponds with an expected or test content. The content assessment may be used to test for further errors as a possibility may exist for the service points to be issuing sample message according to the desired, test sequence and for those sample message to have data elements with sample values or the lack of sample values as desired by the test protocol but with the wrong or undesired content or value. The content test for each test message may as examples, but not to be considered limiting, define a content expectation to be one of unchecked, checked for non-empty, checked for specific contents, and checked against regular expression. A content error may be determined for each sample message having unmatched sample and test structures, i.e., those where the sample content value fails to fulfill the one of the unchecked, checked for non-empty, checked for specific contents, and checked against regular expression content expectation. For example, in the event the data element relates to a minimum number of advertisement to be inserted, such as at least two, that message may fail the content test in the event the sample value was one.

The ability to create test structure and test content that completely defines any specific expected message can be very difficult due to the richness of the XML Schema language and resulting complexity of the schemas. The difficulty of that task typically precludes current practice from investing the effort to create such detail in expected messages. Systems representing current practice rely on specific samples of the structure and content of a message, or compare a message with a simple sample message. The present invention provides specific means to enable the production of such complete example messages with far less effort. Further, the present invention provides a unique means of readily defining the subset of a schema applicable to a particular use case and insuring that such sample messages are necessarily in compliance with that schema subset.

The ability to further assess for content errors may be beneficial as a sample message may pass the sequence test if it is in the right order and pass the structure test as long as it has a sufficient sample value but still fail the content test if the content of the sample value is deficient. With respect to the foregoing example of the data element relating to the number of advertisements requested for insertion being two or more, the sample message would pass the sequence and structure test in the event the sample message was properly sequenced and include a sample value of one. This sample message, however, would fail the content test since the sample value content failed to be greater than one, i.e., it failed to represent a request to insertion more than one advertisement. It is believed to be beneficial to for the content test to be dependent upon passage of the structure test as an improper sample value would render the content test unnecessary. The present invention, however, is not necessarily so limited it fully contemplates executing the content test in place of the structure test in order to eliminate the extra processing associated with the structure test. The elimination of the structure test may be undesirable in the event it is desirable to generate a test report or other output reflective of the service point with your greater specificity, i.e., if the structure test is eliminated, it may be more difficult to identify the error as corresponding with a failure to include the expected sample value or the sample value having the wrong content.

The ability of the present invention to provide a multiple stage testing process facilitates generating a test result where errors can be identified at a sequence level, a structure level and/or a content level. This capability can be beneficial in assess exactly where errors occur the service points or node responsible. The foregoing is described with respect to each of the service points associated with the test protocol being active or otherwise enabled to facilitate receiving, processing, and outputting messages. One non-limiting aspect of the present invention contemplates facilitating the test protocol in the event one or more of the service points are inoperable or otherwise not available for the test protocol, such as if the corresponding network connection is unavailable or it is desirable to test one or more of the service points within a laboratory or other testing environment where the other service points are not present. The test protocol may be applied under such conditions with use of emulators configured to emulate the missing or unavailable service point.

The emulators may be part of the tester or otherwise associated therewith and configured to intercept messages destined for the one or more service points to be emulated and/or to output messages for the one or more service points to be emulated. One emulator, for example, may be used in place of the content information server such that any message destined for or intended to be emitted from the content information server are instead communicated by the tester, i.e., the tester would receive the second message from the decision system server and output the third message to the decision system server. The emulators may be configured to output messages matching the corresponding test message in order to insure legal messages are being received by the intended recipient. The use of the emulators may be particularly beneficial in compartmentalizing operations of the service providers to narrow in on errors or to otherwise eliminate variables from the testing, i.e., rather than the potential of each service point introducing errors, one or more of the service points may be emulated to insure no errors are introduced from the emulated service points.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for testing a service, the service being dependent on messages being exchanged between a plurality of service points, the method comprising:

determining a test protocol sufficient to test service point capabilities with respect to providing the service, the test protocol defining a test sequence having a plurality of test messages wherein the test messages are required to be exchanged between service points in order to successfully complete the test protocol, the service requiring output of at least one mutually dependent message to in order to provide the service, each mutually dependent message output resulting from service point processing of at least two other messages defined in the test sequence; and assessing a sample sequence of sample messages exchanged between service points when executing the test protocol, the sample sequence being assessed for sequence errors, the sequence errors coinciding with portions of the sample sequence failing to match with the test sequence; wherein the test protocol defines the test sequence relative to a first server, a second server, a third server, a fourth server and a fifth server; and wherein the test protocol assesses whether:

i) the first server properly outputs a first message to the second server, the first message being one of the sample messages;

ii) the second server properly outputs a second message to the third server, the second message being one of the sample messages;

iii) the second server properly outputs a third message to the fourth server, the third message being one of the sample messages;

iv) the third server properly outputs a fourth message to the second server, the fourth message being one of the sample messages;

v) the fourth server properly outputs a fifth message to the second server, the fifth message being one of the sample messages; and vi) the second server properly outputs a sixth message to the first server, the sixth message being one of the sample messages and being one of the at least one mutually dependent message.

2. The method of claim 1 further comprising:

the test protocol defining a test structure for each test message;

identifying a sample structure for each sample message; and assessing the sample structures for structure errors, the structure errors corresponding with sequentially matched sample and test messages having unmatched sample and test structures.

3. The method of claim 2 further comprising:

the test structure for each test message defining a structure expectation, the structure expectation being one of possibly present, necessarily present, or necessarily absent;

identifying each sample structure to have a sample structure value; and determining the unmatched sample and test structures to be those where the sample structure value fails to fulfill the one of the possibly present, necessarily present, and necessarily absent structure expectation.

4. The method of claim 1 further comprising:

specifying that the messages are valid with respect to some plurality of XML schemas, each including schema-define elements and attributes; and defining a subset of those schemas with respect to the occurrence and content of all the schema-defined elements and attributes such that the resulting subset represents a specific sub-schema for a specific use case.

5. The method of claim 4, further comprising:

defining specific test messages XML documents, the XML documents being conformant in structure and content to one of the specific sub-schema.

6. The method of claim 1 further comprising:

the test protocol defining a test content for each test message;

identifying a sample content for each sample message; and assessing the sample contents for content errors, the content errors corresponding with sequentially matched sample and test messages having unmatched sample and test contents.

7. The method of claim 6 further comprising:

the test content for each test message defining a content expectation, the content expectation being one of unchecked, checked for non-empty, checked for specific contents, and checked against regular expression;

identifying each sample structure to have a sample content value; and determining the unmatched sample and test structures to be those where the sample content value fails to fulfill the one of the unchecked, checked for non-empty, checked for specific contents, and checked against regular expression content expectation.

8. The method of claim 1 wherein the service relates to digital advertisement insertion and the test protocol defines the test sequence relative to the following service points:

wherein the first server is a video-on-demand (VOD) server;

wherein the second server is a decision server; wherein the third server is a content information server;

wherein the fourth sever is a placement opportunity server; and wherein the fifth server is a logging server.

9. The method of claim 8 wherein:

the first message relates to the VOD server requesting advertisement information from the decision system server regarding an advertisement to be inserted within the program being transmitted for viewing;

the second message relates to the decision system server requesting content information from the content information server to facilitate selecting the advertisement;

the third message relates to the decision system server requesting placement opportunity information from the placement opportunity server to facilitate timing insertion of the advertisement;

the fourth message relates to the content information server providing the requested content information to the decision system server;

the fifth message relates to the placement opportunity server providing the requested opportunity information to the decision system server; and the sixth message relates to the decision system server providing the requested advertisement information to the VOD server.

10. The method of claim 8 wherein:

the second message results from the decision system server processing the first message;

the third message results from the decision system server processing the first message;

the fourth message results from the content information server processing the second message;

the fifth message results from the placement opportunity server processing the third message; and the sixth message results from the decision system server processing the fourth message and the fifth message.

* * * * *